United States Patent
Burgess et al.

(10) Patent No.: US 9,525,690 B2
(45) Date of Patent: Dec. 20, 2016

(54) SECURELY INTEGRATING THIRD-PARTY APPLICATIONS WITH BANKING SYSTEMS

(71) Applicant: C1 Bank, St. Petersburg, FL (US)

(72) Inventors: Trevor Burgess, St. Petersburg, FL (US); Marcio deOliveira, Sarasota, FL (US); Michael Claffey, St. Petersburg, FL (US)

(73) Assignee: Bank of Ozarks, Little Rock, AR (US)

( * ) Notice: Subject to any disclaimer, the term of this patent is extended or adjusted under 35 U.S.C. 154(b) by 14 days.

(21) Appl. No.: 14/288,108

(22) Filed: May 27, 2014

(65) Prior Publication Data
US 2015/0350211 A1 Dec. 3, 2015

(51) Int. Cl.
*H04L 29/06* (2006.01)
*H04L 29/08* (2006.01)
*G06Q 40/02* (2012.01)

(52) U.S. Cl.
CPC .............. *H04L 63/10* (2013.01); *G06Q 40/02* (2013.01); *H04L 63/0823* (2013.01); *H04L 63/205* (2013.01); *H04L 67/10* (2013.01); *H04L 2463/102* (2013.01)

(58) Field of Classification Search
CPC ........ H04L 63/10; H04L 67/10; H04L 63/205; H04L 63/0823; G06Q 40/02
See application file for complete search history.

(56) References Cited

U.S. PATENT DOCUMENTS

| | | | | |
|---|---|---|---|---|
| 2003/0182230 A1* | 9/2003 | Pessin | .................... | G06Q 20/00 705/39 |
| 2007/0250906 A1* | 10/2007 | Hattori | ................ | G06F 21/6218 726/2 |
| 2009/0216857 A1* | 8/2009 | Grin | .................... | G06F 17/3089 709/218 |
| 2010/0125737 A1* | 5/2010 | Kang | .................... | G06Q 20/12 713/176 |
| 2010/0191622 A1* | 7/2010 | Reiss | .................... | G06Q 20/02 705/30 |
| 2011/0173684 A1* | 7/2011 | Hurry | .................... | G06F 21/33 726/6 |
| 2011/0219230 A1* | 9/2011 | Oberheide | ................ | H04L 9/32 713/168 |
| 2012/0295587 A1* | 11/2012 | Paya | .................. | H04L 63/0492 455/411 |
| 2012/0316992 A1* | 12/2012 | Oborne | .................. | G06Q 30/06 705/26.41 |

(Continued)

*Primary Examiner* — Joseph P Hirl
*Assistant Examiner* — J. Brant Murphy
(74) *Attorney, Agent, or Firm* — Jeffrey B. Fabian, Esq.; Shumaker, Loop & Kendrick, LLP

(57) ABSTRACT

Systems and methods enable third-party applications and devices to interface with financial service provider computer networks in a secure, compliant manner. In one embodiment, an interface computing device connected to a provider computer network transmits a registration request message to a custodian. The interface computing device receives a registration request response message from the custodian indicating whether the registration request was approved or denied. The interface computing device receives a data request message requesting data stored on the provider computer network. The interface competing device gathers data stored on the provider computer network, sanitizes the data, and generates a response communication using the sanitized data.

15 Claims, 11 Drawing Sheets

(56) References Cited

U.S. PATENT DOCUMENTS

| | | | |
|---|---|---|---|
| 2013/0073467 A1* | 3/2013 | Underwood | G06Q 20/3223 705/71 |
| 2013/0205133 A1* | 8/2013 | Hess | H04L 63/0884 713/155 |
| 2014/0019364 A1* | 1/2014 | Hurry | G06F 21/33 705/67 |
| 2015/0248543 A1* | 9/2015 | Yoshinari | G06F 21/10 726/28 |
| 2015/0254659 A1* | 9/2015 | Kulkarni | G06Q 20/4016 705/71 |
| 2015/0295930 A1* | 10/2015 | Dixon | H04L 63/083 713/181 |

* cited by examiner

| Compliance Dashboard | | |
|---|---|---|
| SOX | | |
| Recent User Logon | Logon Failures | Admin Activity |
| Domain Policy Changes | All File Changes | Terminal Service |
| Logon Duration | Logon History | User Management |
| Group Management | Computer Management | OU Management |
| GLBA | | |
| Successful File Read Acc.. | Folder Permission Chan. | Folder Audit Setting |
| Domain Policy Changes | All File or Folder Change | Terminal Service |
| Logon Duration | Local Logon Failures | User Management |
| Group Management | GPO Management | |

Fig. 8

SECURELY INTEGRATING THIRD-PARTY APPLICATIONS WITH BANKING SYSTEMS

TECHNICAL FIELD AND BACKGROUND

The present invention relates generally to the field of computer interface systems, and more particularly, to secure interfaces for financial service provider computer networks.

As a result of regulatory and security requirements, financial service providers typically operate closed computer systems with strict access controls. Such strict controls negatively impact the functionality of a financial service provider's computer systems and limit the provider's ability to adapt to market demands and to take advantage of opportunities provided by recent advances in computing and mobile technology.

For instance, it is now possible to utilize software applications integrated with mobile computing devices to view and edit financial account information, conduct payment transactions, open new accounts, initiate loan applications, as well as perform a variety of other tasks. However, computer systems operated by financial service providers have a limited ability to exchange information with such third-party applications. It would therefore be advantageous to provide a system that permits financial service providers to securely interface with third-party software applications and devices in a planner that compiles with regulatory requirements and provider policies.

Accordingly, it is an object, of the present invention to provide systems and methods that permit financial service providers to securely interface with third-party software applications and devices in a compliant manner. It is a further object of the present invention to allow financial service providers to control which third-party applications and devices can interact with the provider's computer systems and what sources and types of data can be accessed.

SUMMARY

According to one embodiment of the invention, methods and systems enable a secure interface between a financial service provider computer network and third-party applications and devices. An interface computing device transmits a registration request message to a custodian and receives in return a registration request response message indicating whether the registration request was approved or denied. The interface computing device also receives a data request message requesting data stored on the provider computer network. The interface computing device gathers data stored on the provider computer network, sanitizes the data, and generates a response communication using the sanitized data.

In one aspect of the invention, communications transmitted to and from the custodian are routed through an external API, and communications transmitted to and from the interface computing device are routed through the external API.

In another aspect of the invention, the data request message is transmitted by a third-party application or a second interface computing device. The interface computing device determines whether the data request message, is high risk or low risk. And if the interface computing device determines that the data request message is high risk, the interface computing device encrypts the response communication.

According to one embodiment, the registration request response message includes a challenge token, and in response to receiving the challenge token, the interface computing device transmits a response token to the custodian. The custodian responds by transmitting a working certificate to the interface computing device. In a further aspect of the invention, the registration request message can be an initial enrollment request and include a one-time use enrollment token and at least one hardware identifier.

Another aspect of the invention includes storing API call data to an API call data storage device. The interface computing device can also gather compliance data from the provider computer network, including user logon data, group policy operation data, and file access data. With one embodiment, the interface computing device contains at least one hardware identifier that is periodically transmitted to the custodian for verification.

According to another embodiment of the invention, a system includes a custodian and an external API. Communications transmitted to and from the custodian are routed through the external API. The custodian receives a registration request message transmitted by an interface computing device. The custodian transmits a registration request response message to the interface computing device indicating approval or denial of the registration request. The external API receives a data request message having verification data, and the external API transmits to the custodian a verification request message having verification data. The custodian transmits a verification response message to the external API indicating approval or denial of the verification request. If the verification request was approved by the custodian, the external API transmits the data request message to the interface computing device.

In another embodiment, the data request message is transmitted by a third-party application, and the verification data includes a third-party application identification. The data request message can also be transmitted by a second interface computing device, and the verification data can include a working certificate.

In yet another aspect of the invention, the custodian receives at least one hardware identifier transmitted by the interface computing device. The custodian authenticates the hardware identifier, and disables communications to and from the interface computing device if the hardware identifier cannot be authenticated.

BRIEF DESCRIPTION OF THE DRAWINGS

Features, aspects, and advantages of the present invention are better understood when the following detailed description of the invention is read with reference to the accompanying figures, in which:

FIG. 8 illustrates an exemplary dashboard for accessing self-auditing functions.

DETAILED DESCRIPTION

Figure 1A:
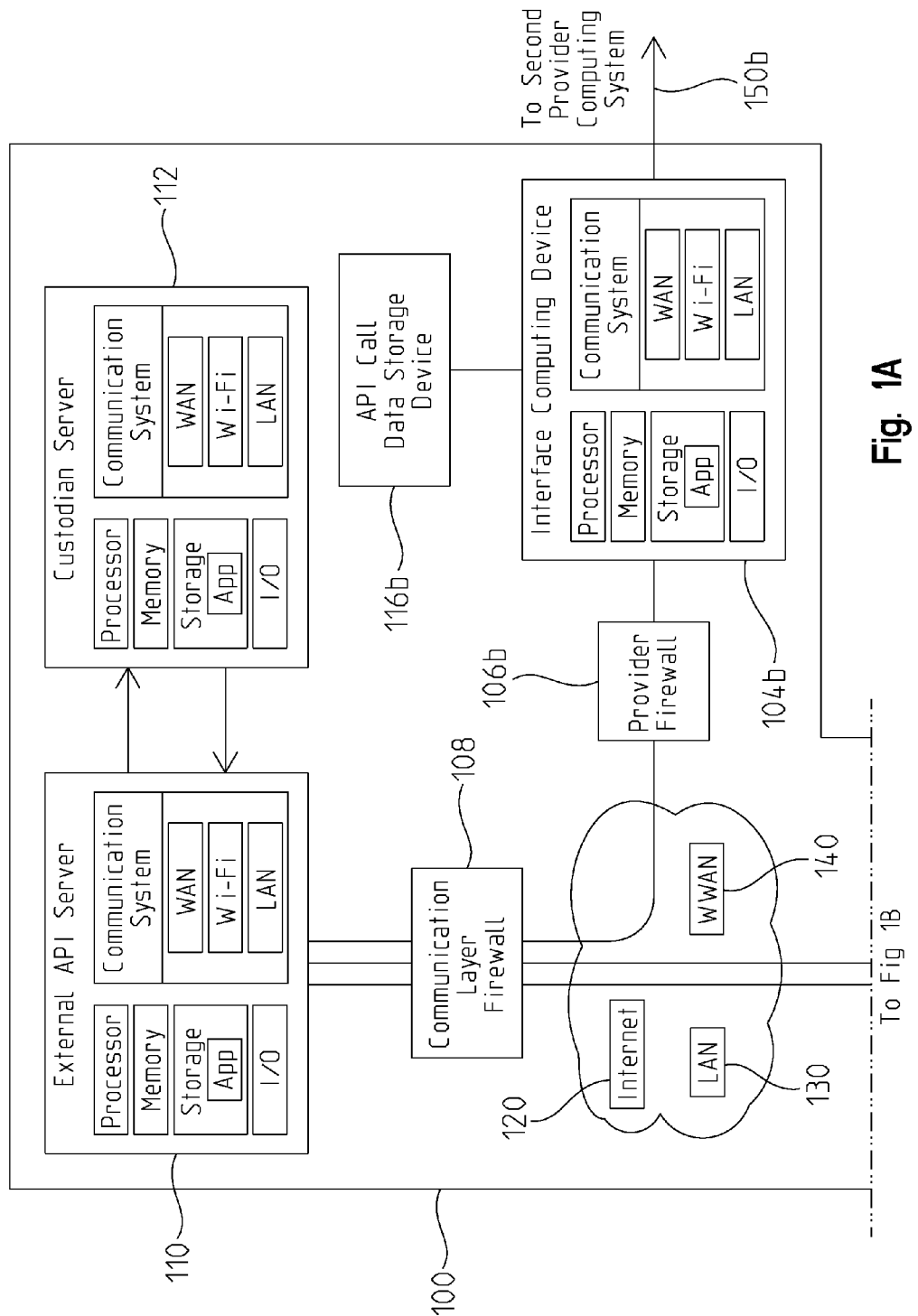
FIGS. 1A-B illustrate an exemplary hardware configuration for a system according to one embodiment of the invention.

The present invention will now be described more fully with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Disclosed are systems and methods for providing a secure interface between a financial service provider's computer system and third-party applications and devices. Financial service providers are able to dynamically act detailed policies governing the interaction between the provider's computer systems and third-parties, including the identity of the applications and devices that are permitted to communicate with a provider's systems, the sources of data that can be accessed, and the types of data that can be shared. The systems and methods utilize a layered approach to limit third-party access to sensitive information and to ensure that the least amount of data required to fulfill a third-party request is exposed. Secure communication protocols are used so that data is exchanged only between trusted applications and devices, and sensitive data cannot be intercepted and read by devices and applications other than those utilized by the parties to a particular communication.

The systems generally include a custodian one or more interface computing device associated with financial service providers, and one or more firewalls, among other components. The systems can optionally include an external application programming interface ("external API") that securely segregates various components of the system, and specifies how certain components should interact. The interface computing devices connect to a financial service provider's computer system and function as the sole or primary conduit for third-parties to access a provider's system. Communications between third-parties and financial service providers can be routed to the interface computing devices via the external API.

Before communication can be established, the interface computing devices and third-party applications and devices are authenticated and registered by the custodian into a "trust cluster" of trusted devices and applications. Only registered applications and devices are permitted to communicate with other components of the system to access data from a financial service provider. Providers can control what sources and types of data can be accessed by registered devices. Providers can also classify the risk posed by each communication and process the communication accordingly. High risk communications can be processed with additional security features, including, for example, asymmetric key encryption.

As used herein, the term financial service provider ("FSP") generally describes a person or entity providing financial services and includes hanks, credit unions, thrifts, alternative financial service providers, or other types of financial institutions. The term FSP is used interchangeably with the terms provider, bank, or financial institution. The term associate is used interchangeably with the terms representative, employee, or personnel, and generally describes an individual employed by or associated with a provider. The term user describes an individual who utilizes the systems and methods of the present invention and can include financial service provider associates or customers. The term customer generally describes an entity or individual utilizing services offered by the financial service provider, and the term may be used interchangeably with the terms consumer or client.

Figure 1B:
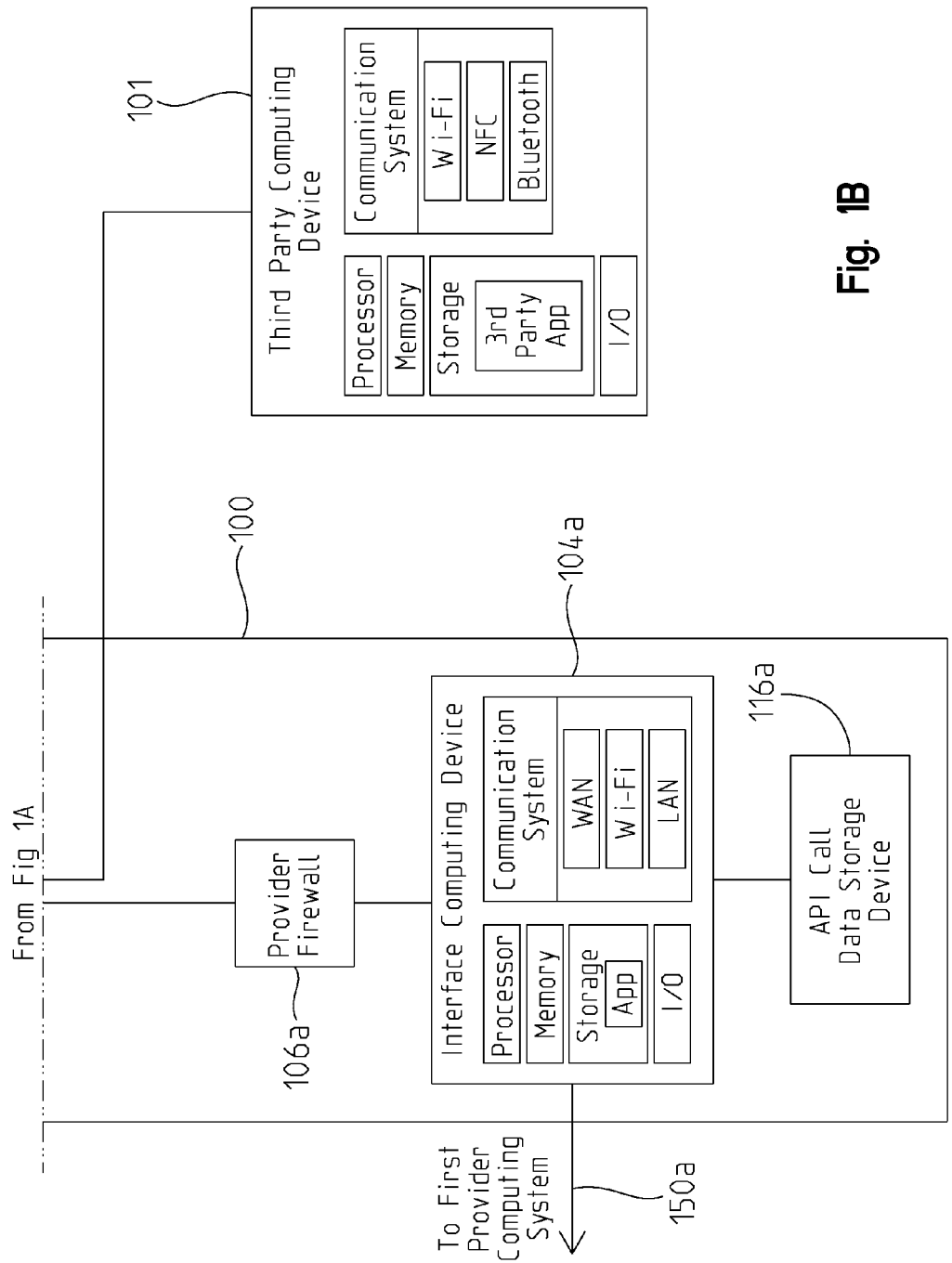

As shown in FIGS. 1A-B, a hardware configuration according to one embodiment of the present invention generally includes an interface competing system 100 and a computing device 101 (e.g., an Internet-enabled device) operated by a third-party. The interface system 100 may include one or mere interface computing devices 104, API call data storage devices firewalls 106 & 108, an optional external API server 110, and a custodian server 112. The interface computing devices 104 can be associated with different financial service providers, or a single provider may utilize multiple interface computing devices 104. A provider may utilize multiple interface computing devices 104 where, for instance, the volume of communication traffic cannot be handled by a single device 104 or where the provider desires to securely isolate various components of its computer system.

The hardware configuration shown in FIGS. 1A-B is not intended to be limiting, and one of ordinary skill in the art will recognize that the systems and methods of the present invention may be implemented using other suitable hardware or software configurations. For example, a single computing device may implement an interface computing device 104 and provider firewall 106, or a single computing device can implement the external API server 110, custodian server 112, and communication layer firewall 108. In a single computing device configuration, the factions of the external API server 110 and custodian server 112 can be performed by separate virtual machines running on a single computing device. Additionally, a single computing device can implement more than one step of the methods disclosed; a single step may be implemented by more than one computing device; or any other logical division of steps may be used.

Any suitable computing device can be used to implement the third-party computing device 101 or the components of the interface computer system 100. The third-party computing device 101, interface computing devices 104, API call data storage devices 110, firewalls 100 & 108, external API server 110, mid custodian server 112 may include a processor that communicates with a number of peripheral subsystems via a bus subsystem. These peripheral subsystems may include a storage subsystem, user-interface input devices, user-interface output devices, a communication system, a network interface subsystem, and a Global Positioning System ("GPS"). By processing instructions stored on one or more storage devices, the processor may perform the steps of the present methods. Any type of storage device may be used, including an optical storage device, a magnetic storage device, or a solid-state storage device.

Typically, the third-party computing device 101 and interface computing devices 104 access the external API server 110 over the Internet 120 in the normal manner—e.g., through one or more remote connections, such as a Wide Area Network ("WAN") or Wireless Wide Area Network ("WWAN") 140 based on 802.11 standards or a data connection provided through a cellular service provider. These remote connections are merely representative of a multitude of connections that can be made to the Internet 120 for accessing various components of the interface computer system 100.

Figure 2:
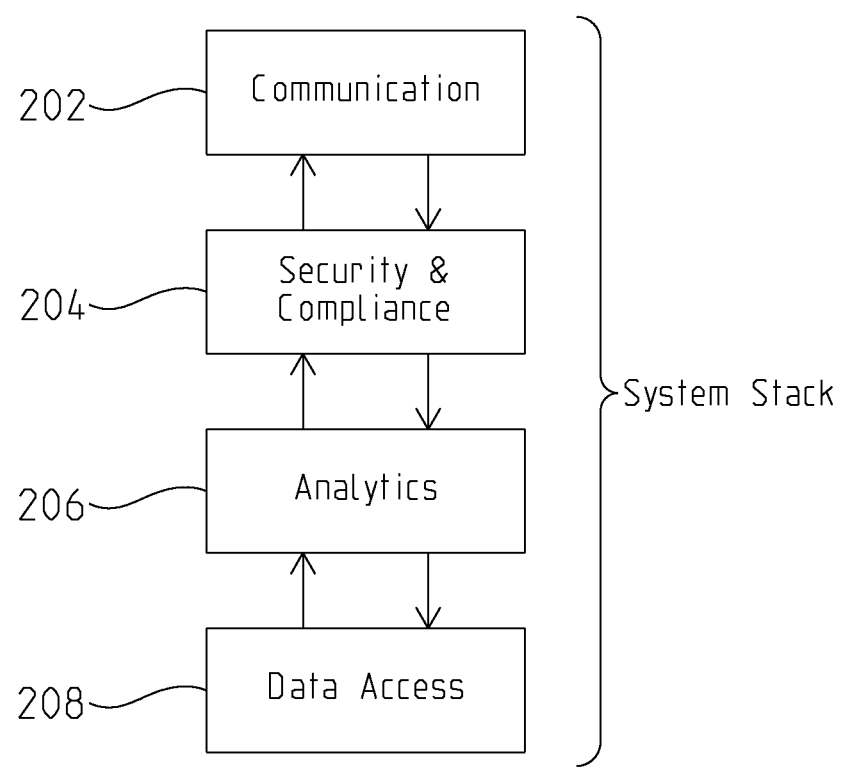
FIG. 2 is a block diagram illustrating the layers of a system according to an embodiment of the invention.
Figure 3A:
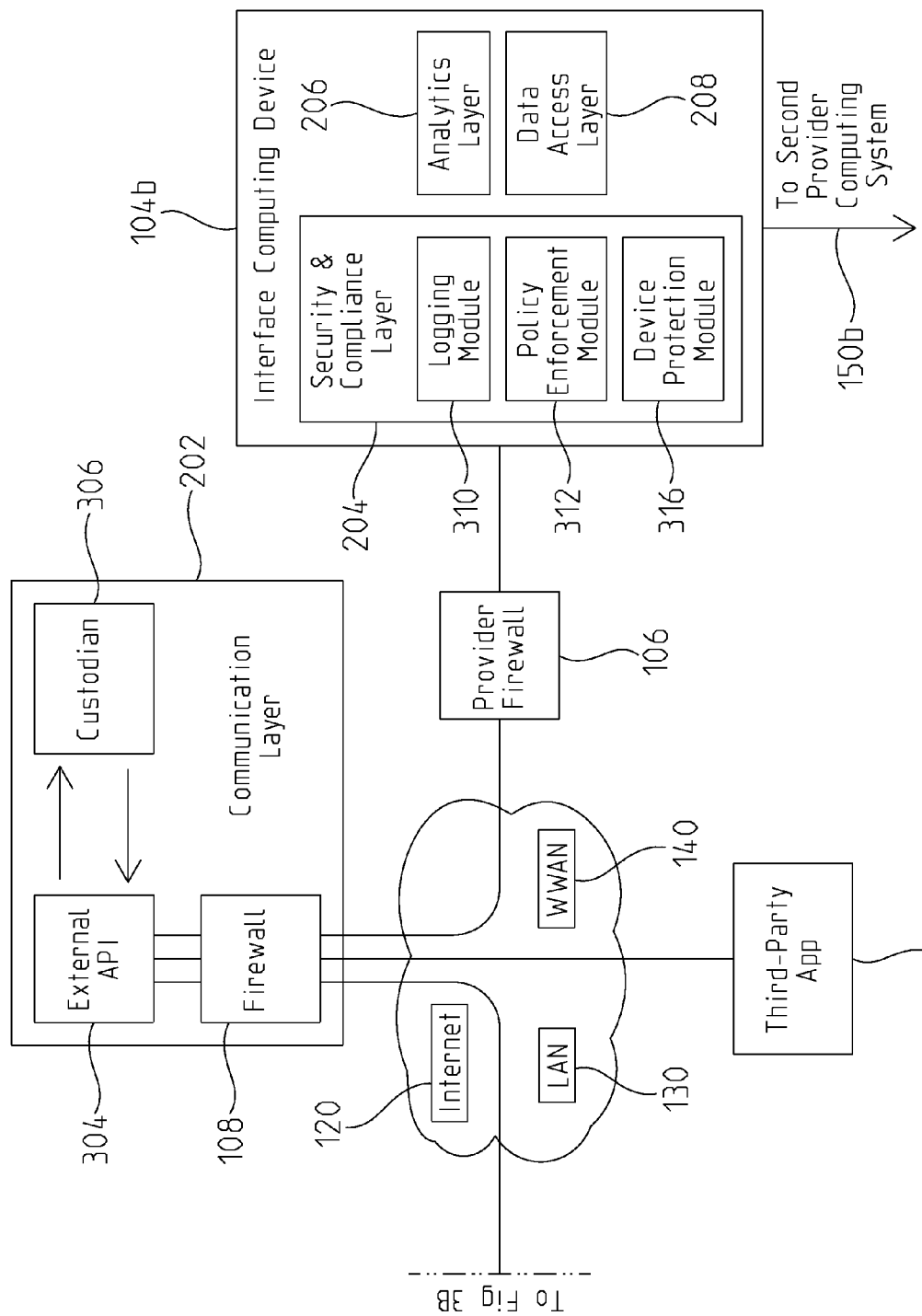
FIGS. 3A-B illustrate an exemplary system diagram according to one embodiment of the invention.
Figure 3B:
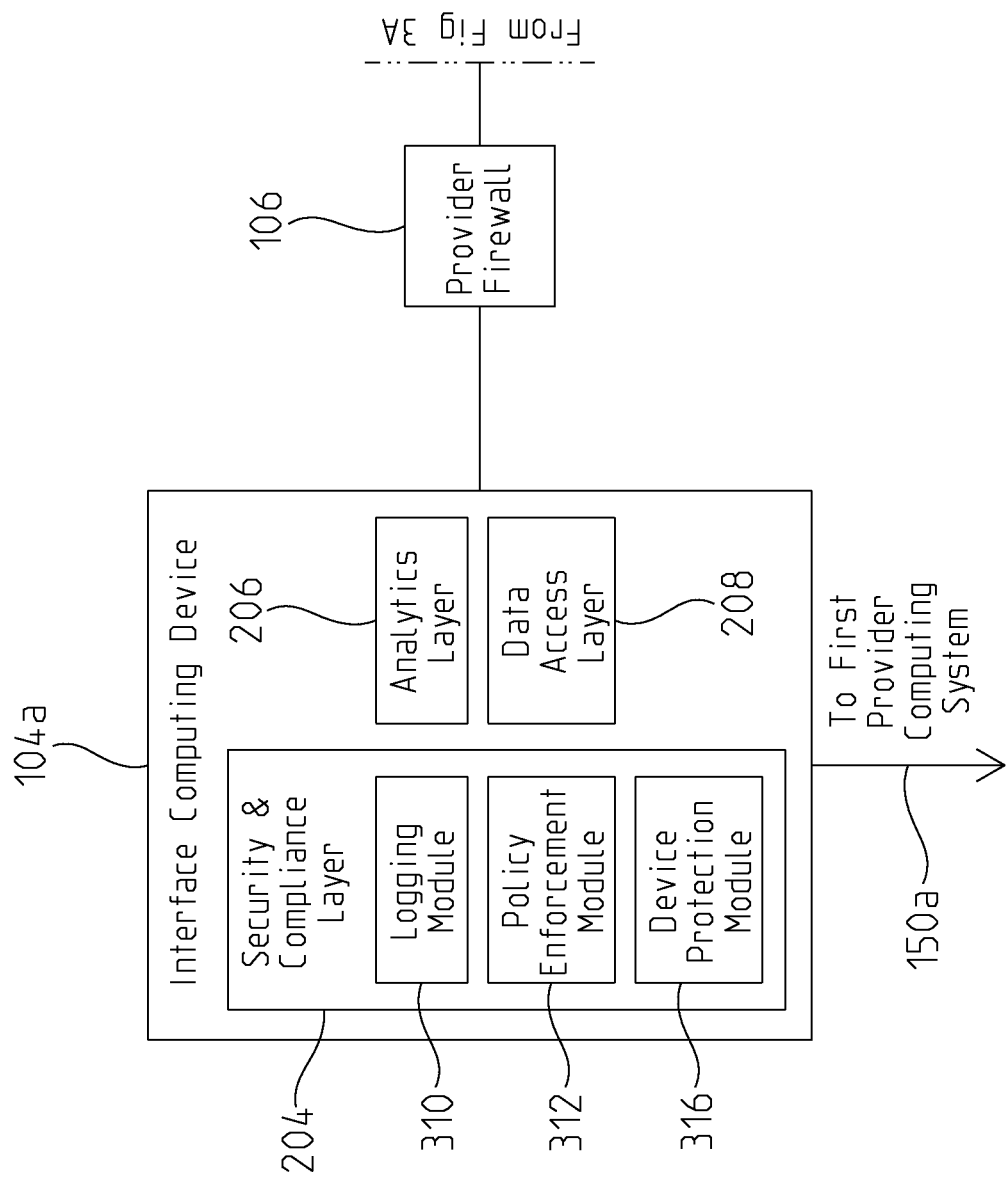

Turning to FIG. 2, the interface systems of the present invention can be implemented using distinct layers, including: a communication layer 202; a security and compliance layer 204 ("security layer"); an analytics layer 106; and a data access layer 208. The interface computing devices 104, external API server 110, and custodian server 112 include one or more integrated software applications that implement the functions of the system layers. In the embodiment shown in FIGS. 3A-B, the interface computing devices 104 include one or more software applications that implement the security layer 204; analytics layer 206; and data access layer 208. The external API server 110 and custodian server 112 include integrated software applications that implement the external API 304 and custodian 306, which are components of the communication layer 202.

The third-party computing device 101 can be associated with, for example, a consumer, a merchant, or another financial institution attempting to access the provider's computer system 150. The third-party computing device 101 includes one or more integrated software applications 302 that communicate with an external API 304. As an example, the third-party computing device 101 can be a portable electronic device, such as a cellular "smartphone" or tablet computer. And the integrated software application 302 can be a mobile banking application used by a consumer to access financial account information, make payments, as well as other functions. In another embodiment, the third-party computing device 101 is a dedicated point of sale device used by a merchant to make payments to and from a deposit account with a financial service provider.

Utilizing a layered approach, allows for enhanced security by controlling access to a financial service provider's computer system 150 and by minimizing the amount of information required to fulfill data requests from a third-party application 302 or other interface computing devices 104. Communications from third-party applications 302 or other interface computing device 104 are first routed through the communication layer 202.

The communication layer 202 can include a firewall 108, an external API 304, and a custodian 306. The custodian 306 authenticates the device or application that originated a communication and provides directory services that facilitate communication routing. The communication layer 202 can optionally include an external API 304 to securely segregate the custodian 306 and interface computing devices 104 from third-party applications 302 and other components of the interface system 100. The external API 304 can include one or more integrated software applications that facilitate interaction of system components.

As discussed in more detail below, the interface computing devices 104 are responsible for processing sensitive data gathered, from financial service provider computer systems 150. Thus, channeling communications through the communication layer 203 provides additional security by preventing third-party applications 302 and other providers from having direct access to the sensitive data processed by the interface computing devices 104. Instead, all communications received by the interface computing devices 104 are received from a trusted source—i.e., the external API 304 of the communication layer 202.

The custodian 306, through the external API 304, communicates with the interface computing devices 104 and third-party applications 302 using asymmetric key encryption techniques. Asymmetric key encryption uses a private encryption key that must be kept secret from unauthorized users and a public encryption key that cat) be made available through unsecure channels. The public and private keys are mathematically linked. Transmitted data encrypted with the public key can be unencrypted only with the private key, and data encrypted with the private key can be verified only with the public key. Any suitable asymmetric key-encryption algorithm can be used to implement the present invention, including the Rivest-Shamir-Adilman ("RSA") algorithms elliptic curve cryptography, Internet Key Exchange protocols, and PGP encryption protocols, among others.

In a particular communication session between two devices, each device can utilize its own public-private encryption key pair. The encryption key pairs can be exchanged between devices during the initiation of a communication session or during an authentication and enrollment process. Alternatively, the encryption key pairs cast be preinstalled on the computing devices prior to being placed into production. In other words, poor to being used to implement the systems and methods of the present invention, the custodian 306 can be loaded with both its own public-private encryption key pair and the public-private key pair of the interface computing devices 104 and third-party applications 302.

During a communication session where the interface computing, device 104 transmits a communication to the custodian 306 via the external API 304, the interface computing device 104 first encrypts the communication using the custodian 306 public key. Upon receipt, of the communication from the interface computing device 104, the custodian 306 uses the corresponding custodian private key to unencrypt the communication. Conversely, if the custodian 306 transmits a communication to the interface computing device 104, the custodian must first encrypt the message using a separate public key associated with the interface computing device 104. The interface computing device 104 unencrypts the communication received from the custodian 306 using a corresponding private key.

The custodian 306 authenticates and registers interface comparing devices 104 and third-party applications 302 using asymmetric key encryption techniques, one-way hash, algorithms, and hardware and software identifiers integrated with the interface computing devices 104. The hardware identifiers can be associated with the various components of the interface computing devices 104, such as the processor, memory chips, storage devices, communication system components, power management system components, and the like. The hardware identifiers, are known to the custodian 306 and included in communications transmitted by the interface computing devices 104 to the custodian 306. The custodian 306 compares the hardware identifiers received from the interface computing devices 104 to known values to verily dial the interface computing device 104 is authentic and that the hardware components have not been replaced or altered.

In addition to hardware identifiers, the interface computing devices 104 can also include software identifiers. The software identifiers are generated, for example, by creating a one-way hash of one or wore software files stored on the interface computing devices 104. The one-way hash values can be created using compiled software files so that the software source code is not transmitted through an unsecure communication link.

One-way hashing techniques apply a hashing algorithm to known data to create a one-way hash value. Any suitable hashing algorithm can be used, including, but not limited to, SHA-1 or SHA-2 algorithms. A one-way hash value is preferably a value of fixed length that is unique to the known data. In other words, if the known data is changed in any respect, the hash value will also change. The hash value, thus, acts as a fingerprint for the known data.

Before transmitting the software identifiers to the custodian 306, the interface computing device 104 can optionally apply a digital "signature" to the software identifier and other data included in the communication. The digital signature further authenticates the source of a communication and can be accomplished using any suitable technique known to one of ordinary skill in the art.

In one embodiment, the software identifiers are generated by applying one-way hashing algorithms to the software files. The software identifiers are encrypted using the interface computing device 104 private key, and the software identifiers are transmitted to the custodian, 306 through the external API 304 along with the original software files and information about the hashing algorithm. The custodian 306 uses the public key for the interface confuting device 104 to unencrypt the software identifiers received from the interface computing device 104. The custodian 306 then compares the software identifiers against known values to verify the authenticity and integrity of the interface computing device 104 software.

The custodian 306 also applies the hashing algorithm to the original software files received from the interface computing device 104. The custodian 306 compares the calculated one-way hash values to the one-way hash values (i.e., software identifiers) transmitted by the interface computing device 104, if the calculated hash values and the received hash values are the same, then tins indicates that the software identifiers have not been changed or tampered with since being signed and transmitted by the interface computing device 104. Further, because the one-way hash values were encrypted using a private key known only to the interface computing device 104 and unencrypted using the corresponding public key, matching hash values is a positive indication that the communication was, in fact, originated by the interface computing device 104.

Figure 4:
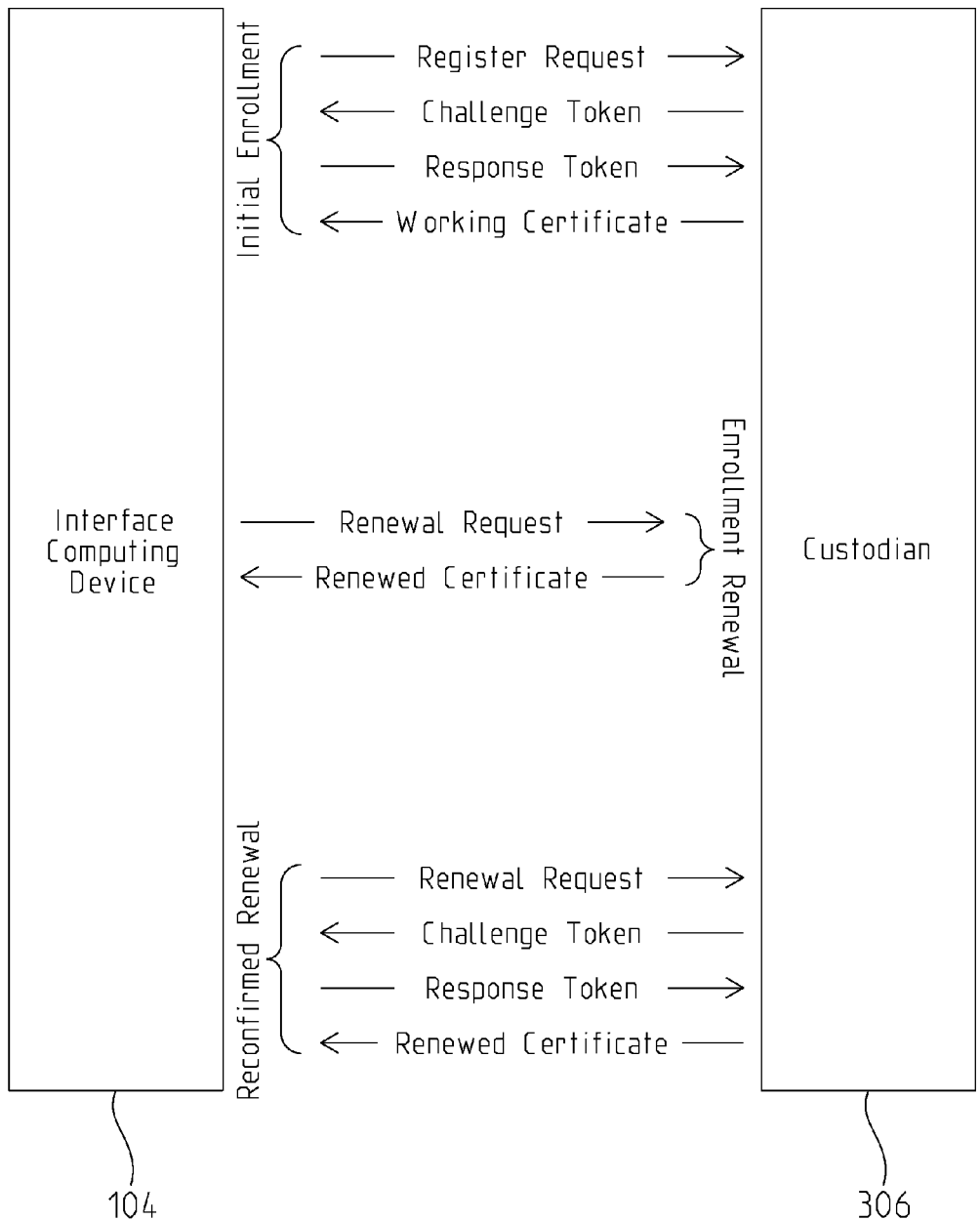
FIG. 4 is au exemplary data flow diagram illustrating authentication and registration by the custodian.

The protocol for authenticating and registering interface computing devices 104 with the custodian 306 can be better understood with, reference to exemplary embodiment shown in FIG. 4. Those of ordinary skill in the art will appreciate that the exemplary authentication and registration protocol shown in FIG. 4 is not intended to be limiting, and other processes and protocols can be used. Further, although FIG. 4 illustrates an authentication and registration protocol with reference to an interface computing device 104, the protocol can also be used to register third-party applications 302 and devices 101.

Alternatively, third-party applications 302 and devices 101 can be preregistered with the custodian 306 prior to being utilized in a production environment. In one example, a financial service provider can create a proprietary mobile banking software application for its customers or a proprietary loan evaluation software application for use by its loan officer associates. These software applications can be assigned unique application identification numbers ("App ID") and application certificates that are stored on the custodian 306 and used to authenticate the software application as a trusted source.

Turning again to FIG. 4, authentication and registration includes three phases: (1) initial enrollment; (2) enrollment renewal; and (3) reconfirmed renewal initial enrollment begins when an interface computing device 104 transmits a registration request message: to the custodian 306 through, the external API 304. The registration request message can include hardware identifiers, software identifiers, and an enrollment token. The registration request message can additionally include a variety of other data useful for enrolling a device or application into the trust cluster, such as information identifying the provider utilizing the interface computing device 104 or information relating to the software configuration of the device 104.

The enrollment token can be, for instance, a randomly generated data string distributed to the interface computing device 104 at the time the device is manufactured as well as loaded into the custodian 306. The enrollment token can optionally be signed and encrypted prior to transmission to the custodian 306. The custodian 306 authenticates the enrollment token, hardware identifiers, and software identifiers using the exemplary techniques discussed above.

The enrollment token can optionally be a one-time use token such that after the custodian 306 authenticates the interface computing device 104, the one-time use enrollment token, is designated by the custodian 306 as expired. Thus, any subsequent attempts to initiate enrollment by impersonating or replicating an interface computing device 104 will fail, thereby ensuring that only authentic devices can be registered into the trust cluster.

The custodian responds to the registration request message by transmitting a registration response message indicating whether the data in the registration request could be authenticated. If, for example, the enrollment token is expired and the interface computing device 104 cannot be authenticated, then the registration request is denied. The interface computing device 104 is then precluded from communication with other devices and applications in the trust cluster.

On the other hand, if the registration request message is authenticated, the custodian 306 transmits a registration response message to the interface computing device 104 that includes a challenge token, as illustrated in FIG. 4. Similar to the enrollment token, the challenge token can be a randomly generated data string that is optionally signed and encrypted by the custodian 306 prior to transmission to the interface computing device 104. The challenge token is transmitted to the interface computing device 104 along with the original random data string, and information about the hashing algorithm used by the custodian 306 to sign the challenge token. The interface computing device 104 processes the challenge token by unencrypting the token with the custodian public key and by calculating a one-way hash value using, the original random data string and the hashing algorithm. The calculated hash value is compared to the hash value received from the custodian 306 to verify its authenticity.

After verifying the challenge token, the interface computing device 104 signs a response token with a preinstalled master device certificate and transmits the response token to the custodian 306 through the external API 304. The custodian 306 authenticates the response token and transmits a working certificate, to the interface computing device 104. The working certificate is used to verily that the device is trusted by the custodian 306. The preinstalled master device certificate, working certificate, or application certificate can contain a variety of information useful for authenticating a device or application such as: (1) a certificate serial number; (2) a distinguished name identifying the certificate authority that issued the certificate; (3) a distinguished name identifying the certificate holder; (4) information about the public key and encryption algorithm used by the certificate holder; (5) the period during which the working certificate is valid; (6) the hashing algorithm used by the certificate authority to create its digital signature: (7) a certificate extension indicating the type of certificate (e.g., a server secure socket layer certificate, a certificate for signing email, etc.); and (8) any other useful information.

The working certificate must be renewed at a frequency defined by the custodian 306. The working certificate can be set to expire after a predetermined number of uses or after a specified time period. Before the working certificate expires, the interface computing device 104 transmits a renewed registration, request message to the custodian 306 through the external API 304, and the custodian 306 transmits a renewed working certificate to the interface computing device 104.

The number of renewal requests granted for each working certificate is recorded and stored to a database associated with, the custodian 306. If the number of renewal requests is above a predetermined threshold, then the custodian 306 will not transmit a renewed working certificate to the interface computing device 104 in response to a renewed registration request message. Instead, the custodian transmits a challenge token 306 to the interface computing device 104 that submitted the renewed registration request message. The interface computing device 104 processes the challenge token, as described above, and transmits a response token to the custodian 306. The custodian 306 authenticates the response token and transmits a new working certificate to the interface computing device 104.

During authentication and registration, the custodian 306 assigns each interface computing device 104 a unique destination identification ("destination ID") and each third-party application 302 a unique App ID and application certificate. The destination ID is included with communications transmitted through the external API 304 and is used by the custodian 306 to locate the target computing device and facilitate proper communication routing. The App ID is included in the metadata of communications transmitted by the third-party application 302 for use by the custodian 306 in verifying, the authenticity of the third-party application 302.

To further facilitate routing of communications, the system can also include a directory service application that utilizes publicly available data to locate target computing devices. The directory service application can be integrated with the external API server 110 or custodian server 112. Publicly available data used to locate a device can include, for example, the name of a financial service provider, the name of a provider employee, the routing number of the provider, or the geographic location of the target computing device.

Figure 5:
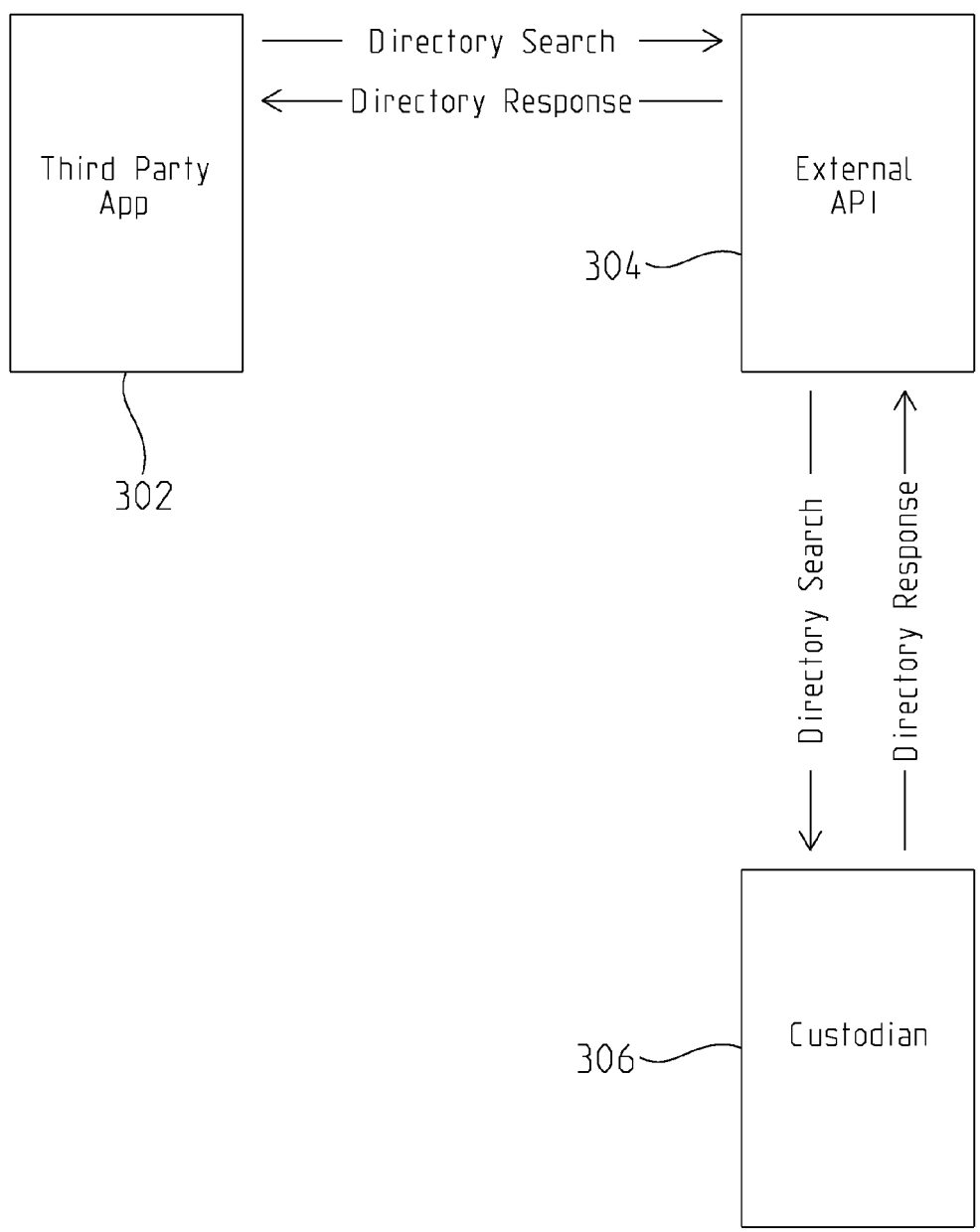
FIG. 5 is an exemplary data flow diagram illustrating operation of a directory service.

The operation of a directory service application according to one embodiment of the invention is illustrated in FIG. 5. A third-party application 302 transmits to the external API 304 a directory search message that contains publicly available data about the target computing device, such as the name of a financial service provider or provider employee. The external API 304 forwards the directory search message to the custodian 306. Based on public data contained in the search request, the custodian 306 identifies an internet protocol ("IP") address, destination ID, or other location data for the target computing device. The custodian 306 transmits a directory response message containing the location data to the external API 304, and the external API 304 transmits the directory response message to the third-party application 302. The third-party application 302 can include the location data in future communications transmitted to the external API 304 to ensure that communications are properly routed to the target computing device.

Figure 6:
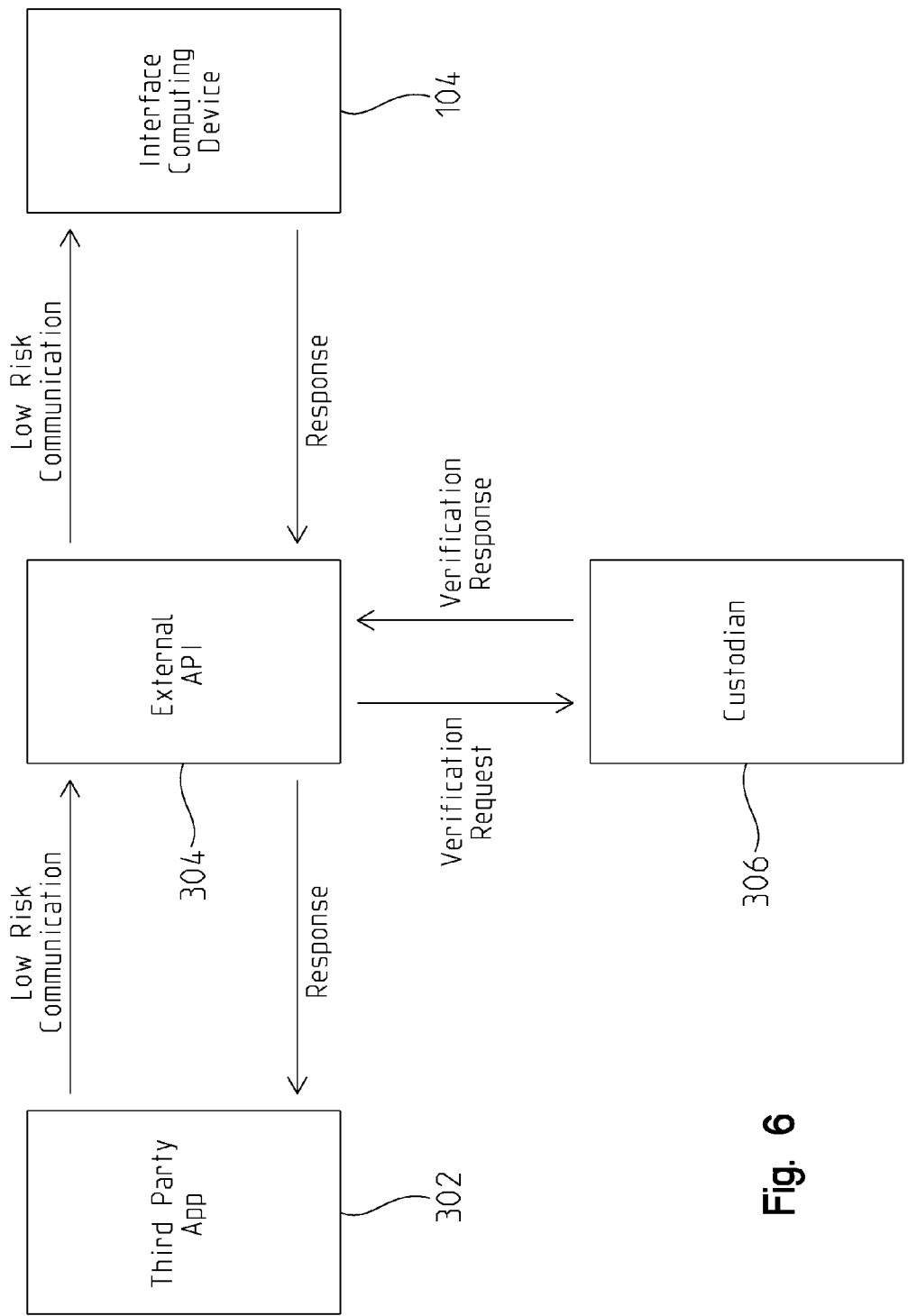
FIG. 6 is an exemplary data flow diagram illustrating the processing of a low risk communication.
Figure 7:
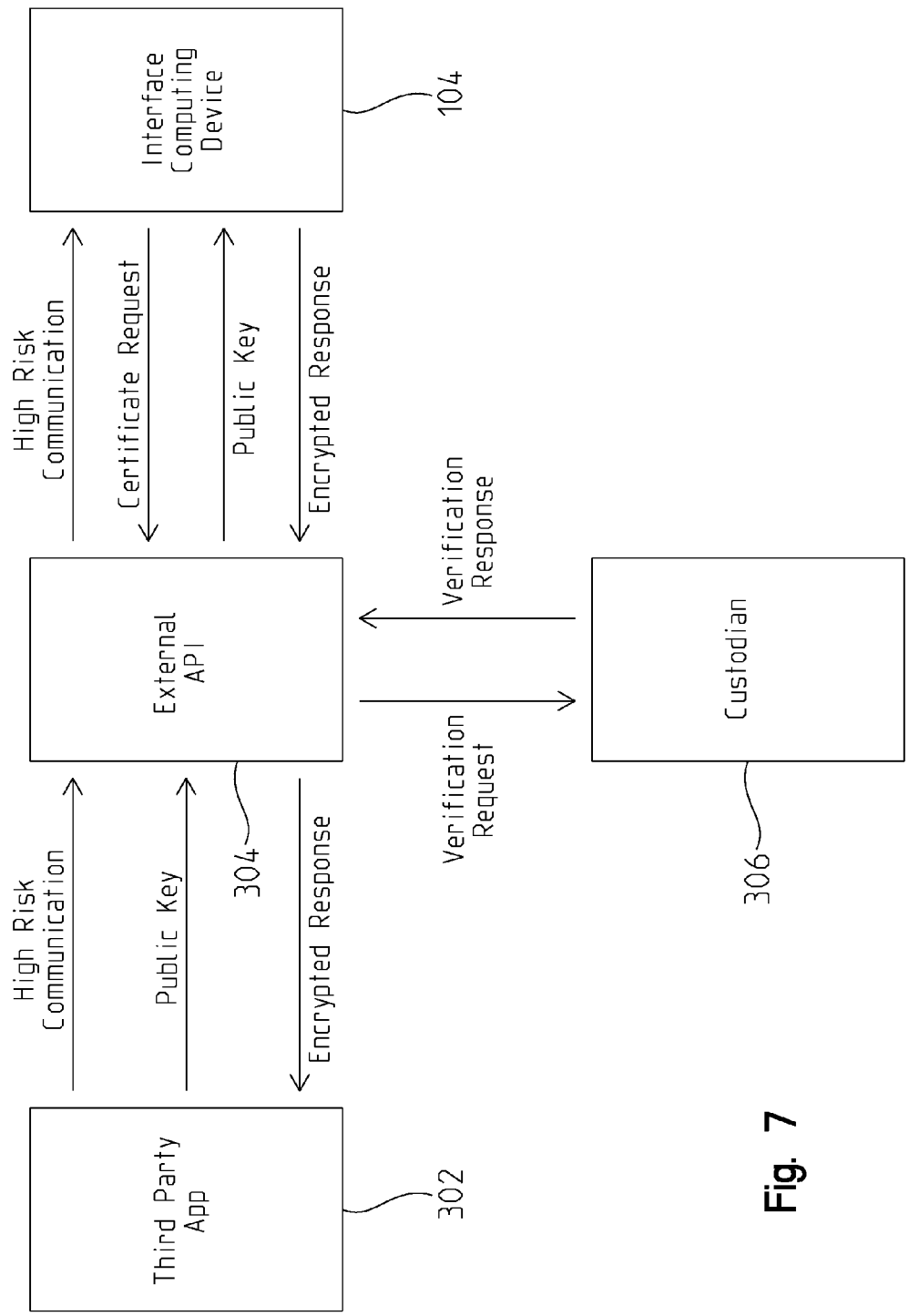
FIG. 7 is an exemplary data flow diagram illustrating the processing of a high risk communication.

Communication layer 202 processing of communications between third-party applications 302 and provider computing devices 104 is illustrated in FIGS. 6-7. Communications from third-party applications 302 or other interface computing devices 104 are classified by the dynamic policy enforcement module 312 of the security layer 204 as either high or low risk. The risk classification of communications can be determined and changed according to provider policies or regulatory requirements.

To illustrate, a customer may use a mobile, banking application 302 to request a wide variety of information from a financial service provider's compiler system 150. A customer may request information concerning products offered by the financial service provider, or the customer may request information concerning the aggregate dollar amount of withdrawals from the customer's deposit account over a given time period. The product information request might be classified as low risk since if does not entail the transmission of sensitive customer account data. On the other hand, the request for an aggregate dollar amount of withdrawals might be classified as high risk because the request might contain information identifying the customer as well, as sensitive information about the customers finances.

The processing of a low risk communication according to one embodiment is illustrated in FIG. 6. To process a low risk communication the third-party application 302 or interface computing device 104 transmits a communication to the external API 304 that includes verification data, such as an App ID or a working certificate, as well as any API required validation data, such as a user identification and password or an application certificate. The external API 304 transmits a verification request message containing, the validation data to the custodian 306 for authentication. The custodian 306 returns a verification response message to the external API 304 indicating whether or not the validation data could be authenticated.

If the custodian 306 authenticates the validation data, the external API 304 transmits the low risk communication to the interface computing device 104 to which the communication was directed. If the authentication fails, the external API 304 can transmit a message to the originating third-party application 302 or interface computing device 104 requesting that validation data be retransmitted. Alternatively, the external API 304 can transmit a message to the originating third-party application 302 or interface computing device 104 indicating that the authentication failed and the communication session is being terminated. The external API 304 can also transmit a message to the third-party application 302 or interface computing device 104 to initiate the authentication and registration procedure if, for instance, the validation data has expired.

After receiving a communication, the dynamic policy enforcement module 312 of the interface computing device 104 determines whether the communication is high risk or low risk. If the communication is classified as low risk, then the interface computing device 104 processes the communication and transmits a response via the external API 304 to the third-party application 302 or originating interface computing device 104.

Otherwise, if the communication is classified as high risk, the interface computing, device 104 transmits a certificate request message to the custodian 306 via external API 304 to initiate a high risk communication protocol, such as the exemplary protocol illustrated in FIG. 7. High risk communications are processed with additional security features over low risk communications, such as asymmetric key encryption. The interface computing device 104 also transmits a communication status code to the third-party application 302 or interface device 104 that originated the communication. The communication status code prompts the originating application or device to encrypt and retransmit the communication as part of the high risk communication protocol.

In response to the certificate request message, the custodian 306 determines whether a copy of the public key for the third-party application 302 or originating interface computing device 104 is stored to a database associated with the custodian 306. If the public key is available, the custodian 306 transmits the public key to the interface computing device 104 via the external API 304. If the public key is not available, the custodian transmits a message to the third-party application 302 or originating interface computing device 104 requesting a copy of the public key.

The third-party application 303 or originating interface computing device 104 transmits a copy of the public key to the custodian 306 via the external API 304, and the custodian 306 saves the public key to a database. The custodian 306 also transmits the public key to the target interface computing device 104 for use in encrypting high risk communications. The custodian 306 can optionally generate a certificate identification that correlates to the public key for a particular third-party application 302 or interface computing device 104. The custodian 306 transmits the certificate identification to the third-party application 301 through the external API 304 for use during high risk communications. The certificate identification facilitates efficient communication as the certificate identification can be easier to index and retrieve from memory than the public certificate.

After receiving the public key, the interface computing device 104 processes the high risk communication and uses the public key to encrypt a response message. The interface computing device 104 transmits the response message to the third-party application 302 or originating interface device 404 via the external API 304, The third-party application 302 or originating interface device 104 uses the corresponding private key to unencrypt the response for processing. Thus, the system ensures that only the third-party application 302 or originating interface computing device 104 is able to translate and process the response from the interface computing device 104.

Both high risk and low risk communications are processed, by the security layer 304. In the exemplary embodiment shown in FIGS. 3A-B, the security layer 204 is implemented by a software application integrated with the interface computing device 104. The security layer 104 includes three modules: (1) a logging module 310; (2) a dynamic policy enforcement module 312; and (3) a device protection module 310.

The logging module 310 creates a log file that, contains "API call data" relating to communications transmitted to and from the interface computing device 104. The log file is stored on the interface computing device 104 and may contain a wide variety of API call data, including: (1) the time a communication was transmitted or received; (2) data, like distinguished names or IP addresses, that identify the computing devices that sent or received a communication; (3) data that identifies the software, application that sent or received a communication; (4) whether a communication was high risk or low risk; (5) the sources of data accessed to generate or respond to a communication; (6) data identifying the contents of a communication; and (7) any other relevant information.

API call data from the log file is periodically signed, encrypted, and compressed for archiving and storage to a separate API call data storage device 116. The API call data is archived according to a logging scheduled defined by the financial service providers policies and regulatory requirements. The API call data may be archived to the separate API call data storage device 116 daily, weekly, monthly, or at other suitable time interval defined, by the provider. The API call data storage device 116 is segregated from the provider computing device 104 to ensure the integrity of the archived API call data.

The system may optionally include a device protection module 310 that is configured to disable communications to and from the trust cluster if a security breach is detected. The device protection module 316 utilizes the hardware and software identifier verification techniques discussed above to ensure the integrity of the hardware and software configuration for the interface computing device 104. The device protection module 310 can also utilize data from sensors integrated with the interface computing device 104 that, sense changes in the physical condition of the device. For example, the interface computing device 104 can include sensors that monitor whether the casing of the interface computing device 104 has beat opened or whether hardware components have been removed. The interface computing device 104 can also utilize a GPS device that monitors its geographic location.

The device protection module 316 can be configured to periodically transmit the hardware and software identifiers and sensor data to the custodian 306 through the external API 304 for authentication. The identifiers and sensor data can be authenticated during working certificate renewal requests or during the reconfirmed renewal process. Alternatively, the identifiers and sensor data can be transmitted to the custodian 306 for authentication at predetermined intervals, such, as daily, weekly, monthly, or any time a change in the identifier or sensor data is detected by the device protection module 316.

A change in the values of the hardware or software identifiers or the sensor data can indicate that the hardware or software configuration of the interface computing device 104 has been tampered with, and communications to and from the interface computing device 104 can be disabled as a result. By monitoring the hardware and software identifiers and sensor data, the device protection module 316 facilitates registration of the provider computing device 104 within the trust cluster.

The security and compliance layer 204 also includes a dynamic policy enforcement module 312 that provides self-auditing functions. The self-auditing functions facilitate a financial service provider's compliance with a variety of regulatory requirements, such as, for example, the Sarbanes-Oxley Act of 2002 ("SOX"), the Gramm-Leach-Bliley Act ("GLBA"), and various payment card industry compliance guidelines. An exemplary dashboard for accessing the self-auditing functions is shown in FIG. 8.

The dynamic policy enforcement module 312 records a variety of compliance data from a financial service provider's computer system 150, including, but not limited to: (1) data relating to user logons (e.g., recent logons, the user identity, logon failures, logon: history, logon duration, etc.); (2) network policy changes; (3) group policy Operations (e.g., password policies, user access permissions to certain features, etc.); (4) terminal services (e.g., use of remote computing resources or virtual machines over a network); (5) organizational unit management (e.g., management and classification of objects in a directory or digital certificate hierarchy); (6) computing device resource management; (7) changes in provider data files and directories; and (8) any other useful information relating to provider policies and regulatory requirements.

Users can access relevant compliance data and generate reports by selecting a category from the dashboard shown in FIG. 8. The dynamic policy enforcement module 312 can also be configured to monitor the compliance data categories in real-time and to detect instances of noncompliance. Instances of noncompliance can be reported to tire appropriate provider associate. In this manner the financial service provider can remain proactive rather than reactive in its approach to remaining compliant with laws and regulations. To illustrate, the policy enforcement module 312 can facilitate compliance with the GLBA privacy requirements by reporting instances where files containing, nonpublic personal information, for a provider's customers have been accessed by an unauthorized user or software application.

The dynamic policy enforcement module 312 also controls what sources of data can be accessed as well as the type of data that can be transmitted to particular third-party applications 302, other provider computer systems 150, and other interface computing devices 104. The dynamic policy enforcement module 312 is dynamic in that the data access policies can be modified to meet a provider's needs as it implements new features and services and as regulatory requirements change.

To illustrate, a provider may configure the policy enforcement module 312 so that transaction data relating to the date and amount of financial account withdrawals is shared with a customer using a mobile banking application 302, but data regarding the identity and geographic location of the payee is withheld. If the provider later incorporates a budgeting feature info the mobile banking application 302, the provider can modify the policy enforcement module 312 so that, geographic location and payee identifying data is disclosed. This would permit provider customers utilizing the budgeting feature of the banking application. 302 to monitor where money is being spent and the category of the expenditures (e.g., whether the money was spent on food, fuel, entertainment, etc.).

As another example, a provider can initially preclude any customer data from being shared with identity management services ("IdM") associated with a customer. An IdM service is an account that permits authentication of the customer's identity and management of the customer's preferences or other information. Examples include social media accounts, employer accounts, or merchant loyalty accounts. If the provider later implements software applications and features that permit customer's to link IdM services with financial accounts, the policy enforcement module 312 can be modified to allow certain data to be shared with an IdM service.

In one feature, a customer utilizes a mobile bailing application 302 that in configured to communicate with the customer's IdM service to gather relevant data prior to initiating a payment transaction with a merchant. The IdM service can provide relevant data, such as merchant ratings; cost comparisons; and payment transaction rules, restrictions, or controls. The IdM service can also provide information useful for ensuring the security of the transaction, such as cancelable biometric data, a personal identification number ("PIN"), gesture recognition information, federated identification information, or geographic restrictions on where payment transactions can be authorized. The policy enforcement module 312 can be modified to permit such information to be gathered by the IdM service from a provider's computer systems 150 so that the information can be stored with the IdM service and used during payment transactions.

Figure 9:
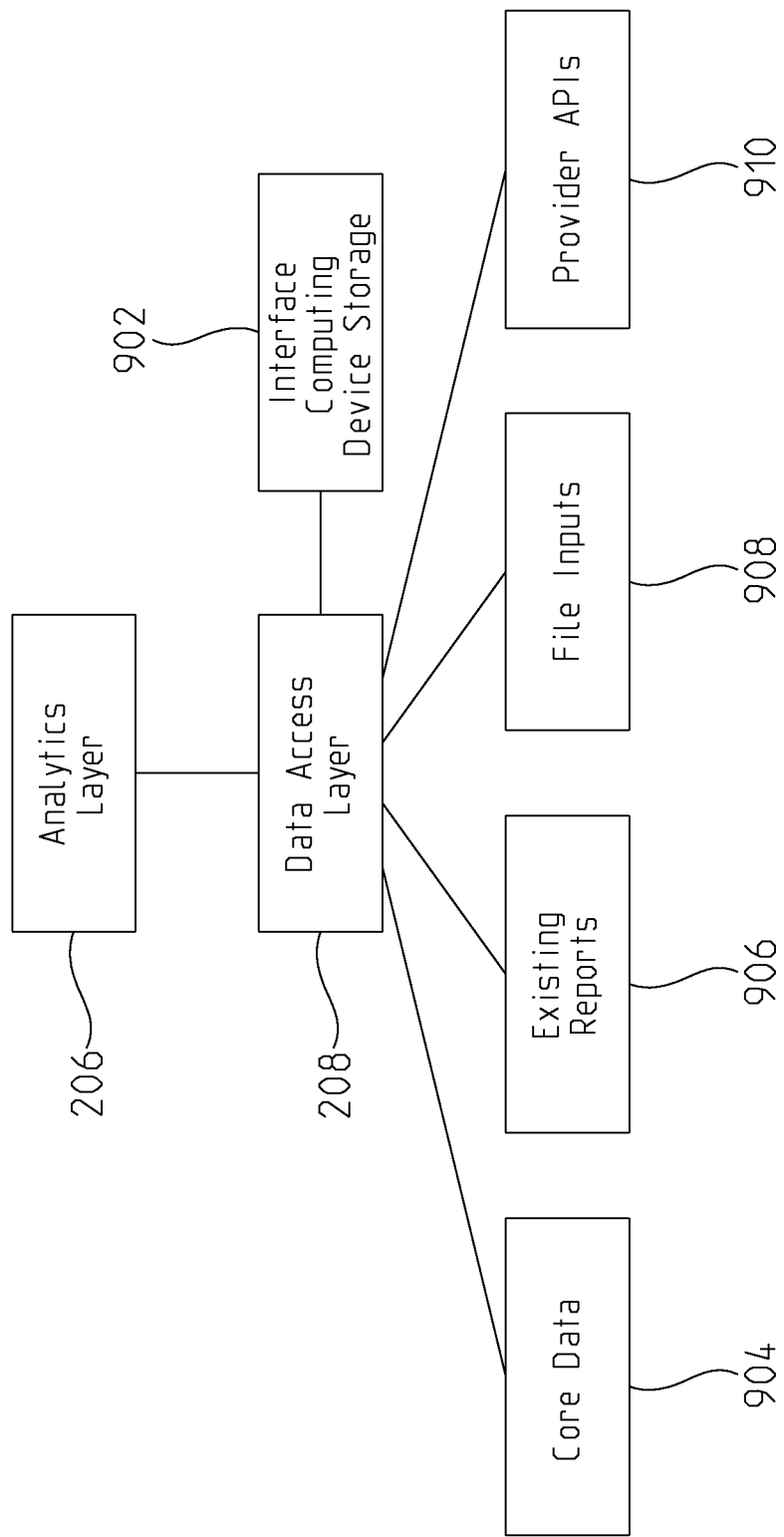
FIG. 9 is a block diagram illustrating the interaction of the analytics layer and the data access layer according to one embodiment.

The systems of the present invention also include an analytics layer 206 that sanitizes data received from a data access layer 208 and that transforms the data into a format that is usable by third-party applications 303 and the self-auditing functions. As part of transforming the data into a useable format, the analytics layer 206 can be configured to perform, specified analyses on the raw data received from the data access layer 208 prior to transmission of the sanitized data to third-party application 302 or other interface computing devices 104. The interface between the analytics layer 206 and the data access layer 208 is illustrated in FIG. 9.

The analytics layer 206 communicates directly with the data access layer 208 to gather raw data from a variety of sources available to the interface computing device 104. Sources of raw data include core data 904, existing provider reports 906, flat file inputs 908, provider software applications: or APIs 910, and third-party data sources, among others. As an example, the data access layer 208 may gather core data 904 from transaction databases residing in a provider's core system, for transmission to a third-party mobile banking application 302. The provider's core system can be implemented as a software application running on a back end server that performs core operations of banking, like recording transactions, passbook maintenance, interest calculations on loans and deposits, and storing customer records.

As a further example, the data access layer 208 may facilitate self-auditing by gathering data from reports 906 of a provider's financial condition, such as a Uniform Bank Performance Report or a Consolidated Report of Condition and Income ("call report"). The data access layer 208 also gathers data used by other provider software applications or APIs 910. With respect to compliance information, the self-auditing functions might require data from network security software applications used by the provider, such as software applications that set group policies and implement organizational unit management functions.

The raw data gathered by the data access layer 208 is fed to the analytics layer 206 for sanitizing and processing. The sanitized data is stored by the data access layer 208 to a database on the interface computing device storage 902. Once sanitized, the raw source data is no longer required and is deleted. Discarding the raw data after sanitation is done to reduce the overall storage requirements for the system and to minimize the amount of data exposed to third-party applications 302 and other interface computing devices 104.

The functions of the analytics layer 200 and data access layer 208 can be better understood with reference to the following simplified examples. Continuing with the example above, a provider's policies set in the policy enforcement module 312 might preclude the sharing of certain transaction, data with, third-party mobile banking applications 302, such as geographic location, and payee data. When processing a request for transaction data from a third-party banking application 302, the data access layer 208 retrieves raw transaction data 904 from the provider's core system. The analytics layer 206 sanitizes the core transaction data 904 by purging geographic location and payee and transforms the remaining core transaction data 904 into a file format usable by the third-party banking application 302.

The sanitized transaction data is stored by the data access layer 208 to a database on the interface computing device storage 902, and the sanitized data is transmitted to the requesting third-party application 302 via the external API 304. API call data relating to the data request and response are stored to a log file by the logging module 310 and saved to the interface computing device storage 902. The API call data is signed, compressed, encrypted, and archived to the API call data storage device 116 according to provider policies and regulatory requirements.

In another example, the third-party application 302 can be a software application utilized by a provider employee to identify provider customers at risk for possible attrition, such as customers that are maintaining an unusually low account balance or that have recently shown a significant decrease in account activity. The third-party application 302 can request information relevant to determining customer attrition front the provider's computing system 150. The request is routed through the external API 304 to the interface computing device 104.

The data access layer 208 retrieves from the provider s core system customer account data 904 that is relevant to determining attrition risk, such as historical account balance and transaction data. The analytics layer 206 processes the data 904 to determine whether certain customers are at a high, moderate, or low risk of attrition. The customer historical account balance and transaction data. 904 is sanitized by the analytics layer 206. The data is also indexed and saved to the interface computing device storage 902 in a file format usable by the third-party application 312.

In sanitizing the data, the analytics layer 206 might remove data regarding specific customer transactions hut retain data concerning average account balances and the number of deposits and withdrawals over a specified time period. Thus, the amount of data exposed is limited to only the data required to respond to the request. The raw data is deleted, and the customer attrition risk and relevant customer data is saved to the interface computing device storage 902 by the data access layer 208. The customer attrition risk and relevant customer data is also transmitted to the third-party application 302 via the external API 304. The data request and response are logged by the logging module 310 and later archived to an API call data storage device 116.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer-implemented method of interfacing with a computer network comprising the steps of:
    (a) providing an interface computing device connected to a provider computer network;
    (b) transmitting, by the interface computing device, a registration request message to a custodian, wherein the registration request comprises and enrollment token and at least one hardware identifier;
    (c) receiving by the interface computing device, a registration request response message transmitted by the custodian indicating whether the registration request was approved or denied, wherein the registration request response message comprises a challenge token;
    (d) transmitting by the interface computing device, a signed response token to the custodian;
    (e) receiving by the interface computing device, a working certificate transmitted by the custodian;
    (f) receiving by the interface computing device, a data request message requesting data stored on the provider computer network;
    (g) determining by the interface computing device, whether the data request message is high risk or low risk;
    (h) gathering by the interface computing device, data stored on the provider computer network;
    (i) sanitizing by the interface computing device, data gathered from the provider computer network;
    (j) generating by the interface computing device, a response communication using the sanitized data, and
    (k) in response to the interface computing device determining that the data request message is high risk, encrypting the response communication.

2. The method of claim 1, wherein:
communications transmitted to and from the custodian are routed through an external API; and
communications transmitted to and from the interface computing device are routed through the external API.

3. The method of claim 1, wherein the data request message is transmitted by a third-party application or a second interface computing device.

4. The method of claim 1 further comprising the step of storing by the interface computing device, API call data to an API call data storage device.

5. The method of claim 1 wherein:
the interface computing device comprises at least one hardware identifier; and
the method further comprises the step of periodically transmitting the at least one hardware identifier to the custodian.

6. The method of claim 1 further comprising the step of gathering by the interface computing device, compliance data from the provider computer network.

7. The method of claim 6, wherein the compliance data comprises user logon data, group policy operation data, and file access data.

8. A computer-implemented method of interfacing with a computer network comprising the steps of:
    (a) providing a custodian and an external API, wherein communications transmitted to and from the custodian are routed through the external API;
    (b) receiving by the custodian, a registration request message transmitted by an interface computing device, wherein the registration request message comprises an enrollment token and at least one hardware identifier;
    (c) transmitting by the custodian, a registration request response message to the interface computing device indicating approval or denial of the registration request, wherein the registration request response message comprises a challenge token;
    (d) receiving by the custodian, a signed response token transmitted by the interface computing device;
    (e) transmitting by the custodian, a working certificate to the interface computing device;
    (f) receiving by the external API, a data request message having verification data;
    (g) receiving by the custodian, a verification request message having verification data transmitted by the external API;
    (h) transmitting by the custodian, a verification response message to the external API indicating approval or denial of the verification request; and
    (i) in response to the verification request being approved by the custodian, transmitting by the external API, the data request message to the interface computing device.

9. The method of claim 8, wherein:
the data request message is transmitted by a third-party application; and
the verification data comprises a third-party application identification.

10. The method of claim 8, wherein:
the data request message is transmitted by a second interface computing device; and
the verification data comprises a working certificate.

11. The method of claim 8, wherein the registration request message comprises at least one hardware identifier identifying a source computing device, and wherein the method further comprises the steps of:
authenticating by the custodian, the hardware identifier; and
disabling communications between the interface computing device and the source computing device if the hardware identifier cannot be authenticated.

12. A system for interfacing with a computer network comprising:
a first processor associated with a custodian;
a second processor associated with an interface computing device, the second processor connected to a provider computer network; and
a data storage device including a non-transitory computer-readable medium having computer readable code for instructing the processors, and when executed by the processors, the processors perform operations comprising:
(a) transmitting, by the second processor, a registration request message to the first processor, wherein the registration request message comprises an enrollment token and at least one hardware identifier;
(b) receiving by the second processor, a registration request response message transmitted by the first processor indicating whether the registration request was approved or denied, wherein the registration request response message comprises a challenge token;
(c) receiving by the custodian, a signed response token transmitted by the interface computing device;
(d) transmitting by the custodian, a working certificate to the interface computing device;
(e) receiving by the second processor, a data request message requesting data stored on the provider computer network;
(f) determining by the second processor, whether the data request message is high risk or low risk;
(g) gathering by the second processor, data stored on the provider computer network;
(h) sanitizing by the second processor, data gathered from pre provider computer network;
(i) generating by the second processor, a response communication using the sanitized data; and
(j) in response to the second processor determining that the data request message is high risk, encrypting the response communication.

13. The system of claim 12, wherein:
communications transmitted to and from the first processor are routed through an external API associated with the first processor; and
communications transmitted to and from the second processor are routed through the external API.

14. The system of claim 12, wherein the data request message is transmitted by a third processor associated with a third-party application or a fourth processor associated with a second interface computing device.

15. A system for interfacing with a computer network comprising:
a first processor associated with a custodian and an external APIs, wherein communications transmitted to and from the custodian are routed through the external API;
a second processor associated with an interface computing device, the second processor connected to a provider computer network;
and a data storage device including a non-transitory computer-readable medium having computer readable code for instructing the processors, and when executed by the processors, the processors perform operations comprising:
(a) receiving by the first processor, a registration request message transmitted by the second processor, wherein the registration request message comprises an enrollment token and at least one hardware identifier;
(b) transmitting by the first processor, a registration request response message to the second processor indicating approval or denial of the registration request, wherein the registration request response message comprises a challenge token;
(c) receiving by the first processor, a response token transmitted by the second processor;
(d) transmitting by the first processor, a working certificate to the second processor;
(e) receiving by the first processor, a data request message having verification data;
(f) receiving by the custodian, a verification request message having verification data transmitted, by the external API;
(g) transmitting by the custodian, a verification response message to the external API indicating approval or denial of the verification request; and
(h) in response to the verification request being approved by the custodian, transmitting by the first processor, the data request message to the second processor.

* * * * *